(12) United States Patent
Woo et al.

(10) Patent No.: US 11,420,642 B2
(45) Date of Patent: Aug. 23, 2022

(54) VEHICLE AND METHOD OF CONTROLLING THE SAME

(71) Applicants: Hyundai Motor Company, Seoul (KR); Kia Motors Corporation, Seoul (KR)

(72) Inventors: Seunghyun Woo, Seoul (KR); Jimin Han, Anyang-si (KR); Jia Lee, Seoul (KR); Kye Yoon Kim, Gunpo-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 16/665,734

(22) Filed: Oct. 28, 2019

(65) Prior Publication Data

US 2020/0148217 A1    May 14, 2020

(30) Foreign Application Priority Data

Nov. 13, 2018  (KR) .......................... 10-2018-0138607

(51) Int. Cl.
 *B60W 50/00* (2006.01)
 *B60W 30/18* (2012.01)
 (Continued)

(52) U.S. Cl.
 CPC .. *B60W 50/0098* (2013.01); *B60W 30/18027* (2013.01); *B60W 40/08* (2013.01);
 (Continued)

(58) Field of Classification Search
 CPC ...................... B60W 2040/0872; B60W 40/09
 See application file for complete search history.

(56) References Cited

U.S. PATENT DOCUMENTS

| | | | |
|---|---|---|---|
| 9,809,228 B2 | 11/2017 | Hong et al. | |
| 2014/0218187 A1* | 8/2014 | Chun | B60K 28/02 340/439 |

(Continued)

FOREIGN PATENT DOCUMENTS

| | | |
|---|---|---|
| JP | 2008-062852 A | 3/2008 |
| JP | 2014-075008 A | 4/2014 |

(Continued)

*Primary Examiner* — Imran K Mustafa
(74) *Attorney, Agent, or Firm* — Morgan, Lewis & Bockius LLP

(57) ABSTRACT

A vehicle configured for determining an emotion state of a user, and adjusting a speed change of the vehicle that exerts an influence on the drive ability on the basis of the determined emotion state, and a method of controlling the same, may include a sensing unit configured to measure an acceleration of a vehicle and a bio-signal of a user; and a control unit connected to the sensing unit and configured to determine emotion state information indicating an emotion state of the user on the basis of the measured bio-signal when the measured acceleration is greater than or equal to a threshold acceleration, and on the basis of the emotion state information and correlation information indicating a relationship between the emotion state information and a drive ability factor related to a drive ability according to a speed change of the vehicle, update a setting value of the drive ability factor.

12 Claims, 10 Drawing Sheets

(51) Int. Cl.
*B60W 40/08* (2012.01)
*B60W 50/08* (2020.01)

(52) U.S. Cl.
CPC ... *B60W 50/085* (2013.01); *B60W 2040/0872* (2013.01); *B60W 2510/0638* (2013.01); *B60W 2510/0657* (2013.01); *B60W 2520/105* (2013.01); *B60W 2540/22* (2013.01); *B60W 2720/106* (2013.01)

(56) References Cited

U.S. PATENT DOCUMENTS

2018/0118219 A1* 5/2018 Hiei ................ B60W 40/09
2018/0281809 A1* 10/2018 Tochioka .......... B60W 50/0098

FOREIGN PATENT DOCUMENTS

| KR | 10-2013-0023535 A | 3/2013 |
| KR | 10-1706142 B1 | 2/2017 |
| KR | 10-1773675 B1 | 9/2017 |

* cited by examiner

FIG. 3

<CORRELATION BETWEEN BIO-SIGNAL AND EMOTION FACTOR>

| BIO-SIGNAL \ EMOTION FACTOR | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| GSR | .875 | .775 | .653 | .353 | .545 | | | | .655 | .545 | | | | | .353 |
| EEG | .555 | 0.864 | .878 | | .545 | | .464 | .477 | .577 | | | | .353 | | |
| Facial Expression | .545 | | .645 | | 0.817 | .545 | | | | | | | | | |

FIG. 4

| TYPE | QUANTITATIVE VALUE |
|---|---|
| DEGREE OF POSITIVE TO RESPONSIVENESS | 40 |
| DEGREE OF POSITIVE TO ACCELERATION CAPABILITY | 60 |
| DEGREE OF POSITIVE TO LINEARITY | 65 |
| DEGREE OF NEGATIVE TO SPEED CHANGE | 25 |

FIG. 5

| EMOTION STATE INFORMATION | DRIVE ABILITY FACTOR | DEGREE OF INCREASE / DECREASE |
|---|---|---|
| DEGREE OF POSITIVE TO RESPONSIVENESS | RATE OF CHANGE IN ACCELERATION, NUMBER OF ENGINE REVOLUTIONS | $\pm A\ m/s^3 / \pm B\ rpm$ |
| DEGREE OF POSITIVE TO ACCELERATION CAPABILITY | RATE OF CHANGE IN ACCELERATION, ENGINE TORQUE | $\pm A\ m/s^3 / \pm C\ kg \cdot f \cdot m$ |
| DEGREE OF POSITIVE TO LINEARITY | ACCELERATION, NUMBER OF ENGINE REVOLUTIONS | $\pm D\ m/s^2 / \pm B\ rpm$ |
| DEGREE OF NEGATIVE TO SPEED CHANGE | ACCELERATION, NUMBER OF ENGINE REVOLUTIONS | $\pm D\ m/s^2 / \pm B\ rpm$ |

| EMOTION STATE INFORMATION | DRIVE ABILITY FACTOR | DEGREE OF INCREASE / DECREASE |
|---|---|---|
| DEGREE OF POSITIVE TO RESPONSIVENESS | RATE OF CHANGE IN ACCELERATION, NUMBER OF ENGINE REVOLUTIONS | $\pm A$ m/s$^3$ / $\pm B$ rpm $\Rightarrow$ $\pm A'$ m/s$^3$ / $\pm B'$ rpm |
| DEGREE OF POSITIVE TO ACCELERATION CAPABILITY | RATE OF CHANGE IN ACCELERATION, ENGINE TORQUE | $\pm A$ m/s$^3$ / $\pm C$ kg·f·m $\Rightarrow$ $\pm A'$ m/s$^3$ / $\pm C'$ kg·f·m |
| DEGREE OF POSITIVE TO LINEARITY | ACCELERATION, NUMBER OF ENGINE REVOLUTIONS | $\pm D$ m/s$^2$ / $\pm B$ rpm $\Rightarrow$ $\pm D'$ m/s$^2$ / $\pm B'$ rpm |
| DEGREE OF NEGATIVE TO SPEED CHANGE | ACCELERATION, NUMBER OF ENGINE REVOLUTIONS | $\pm D$ m/s$^2$ / $\pm B$ rpm $\Rightarrow$ $\pm D'$ m/s$^2$ / $\pm B'$ rpm |

800

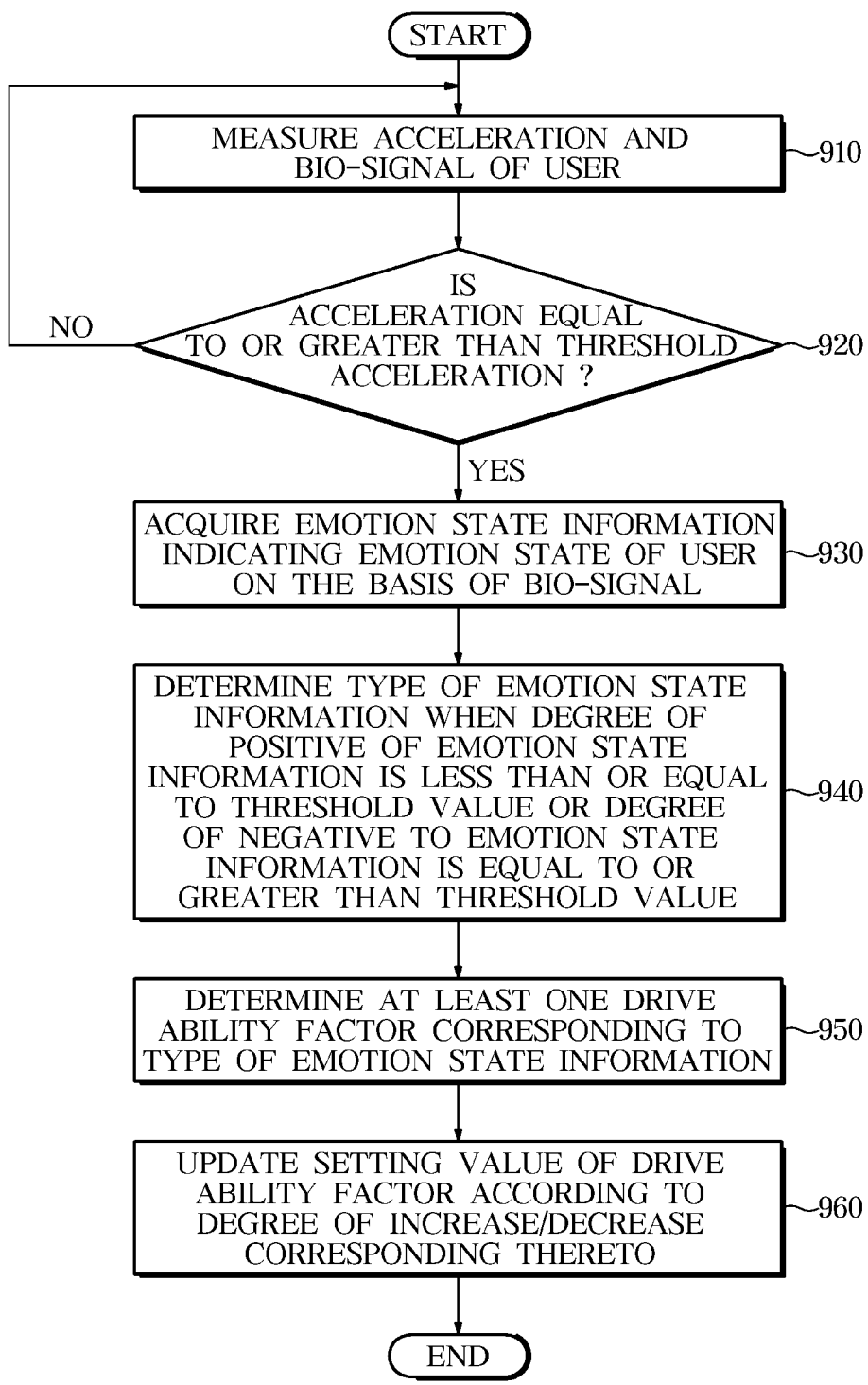

VEHICLE AND METHOD OF CONTROLLING THE SAME

CROSS-REFERENCE TO RELATED APPLICATION

The present application claims priority to Korean Patent Application No. 10-2018-0138607, filed on Nov. 13, 2018 in the Korean Intellectual Property Office, the entire contents of which is incorporated herein for all purposes by this reference.

BACKGROUND OF THE INVENTION

Field of the Invention

The present invention relates to a vehicle for adjusting a speed change of a vehicle on the basis of an emotion state of a user, and a method of controlling the same.

Description of Related Art

Conventionally, drive ability has been developed depending on subjective evaluation. In detail, a drive ability evaluation expert performs drive evaluation in various driving conditions to find a problem, and a vehicle designer adjusts setting values of engine management system (EMS) software and transmission management system (EMS) software.

However, such a development of drive ability through subjective evaluation has limitations in satisfying all drivers, when considering the purpose of the drive ability for improving user satisfaction rather than merely provided as measurement data.

Accordingly, the emotion state of the user is an important factor in developing the drive ability, so there is a demand for a technique of developing the drive ability based on the emotion state of the user.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle capable of determining an emotion state of a user, adjusting a speed change of the vehicle that exerts an influence on the drive ability on the basis of the determined emotion state, and a method of controlling the same.

Additional aspects of the present invention will be set forth in part in the description which follows and, in part, will be obvious from the description, or may be learned by practice of the present invention.

Various aspects of the present invention are directed to providing a vehicle including: a sensing unit configured to measure an acceleration of a vehicle and a bio-signal of a user; and a control unit connected to the sensing unit and configured to determine emotion state information indicating an emotion state of the user on the basis of the measured bio-signal when the measured acceleration is greater than or equal to a threshold acceleration, and on the basis of the emotion state information and correlation information indicating a relationship between the emotion state information and a drive ability factor related to a drive ability according to a speed change of the vehicle, update a setting value of the drive ability factor.

The emotion state information may include at least one type of a degree of positive to a speed responsiveness of the vehicle, a degree of positive to a speed linearity of the vehicle, and a degree of positive to a speed acceleration capability of the vehicle and a degree of negative to the speed change of the vehicle.

The control unit may update the setting value of the drive ability factor such that the degree of positive to the emotion state information is increased or the degree of negative to the emotion state information is decreased.

The drive ability factor may include at least one type of acceleration, a change rate in the acceleration, a number of engine revolutions per minute, and an engine torque of the vehicle.

The correlation information may include information indicating a drive ability factor corresponding to the type of the emotion state information and information indicating a degree of increase/decrease of the setting value according to the type of the drive ability factor.

The control unit may be configured to: determine at least one drive ability factor corresponding to the type of the emotion state information on the basis of the correlation information; and update the setting value of the determined drive ability factor according to the degree of increase/decrease corresponding thereto.

The control unit, when the degree of positive to the speed responsiveness is determined to be equal to or less than a predetermined threshold value, may determine the change rate in the acceleration or the number of engine revolutions per minute as the at least one drive ability factor corresponding to the degree of positive to the speed responsiveness, and may perform the updating such that the change rate of acceleration is increased according to the degree of increase/decrease corresponding thereto or the number of engine revolutions per minute is increased/decreased according to the degree of increase/decrease corresponding thereto.

The control unit, when the degree of positive to the speed acceleration capability is determined to be equal to or less than a predetermined threshold value, may determine the change rate in the acceleration or the engine torque as the at least one drive ability factor corresponding to the degree of positive to the speed acceleration capability, and may perform the updating such that the change rate in the acceleration is increased according to the degree of increase/decrease corresponding thereto or the engine torque is increased/decreased according to the degree of increase/decrease corresponding thereto.

The control unit, when the degree of positive to the speed linearity is determined to be equal to or less than a predetermined threshold value or the degree of negative to the speed change is determined to be higher than or equal to a predetermined threshold value, may determine the acceleration or the number of engine revolutions per minute as the at least one drive ability factor corresponding thereto, and may perform the updating such that the acceleration is decreased according to the degree of increase/decrease corresponding thereto or the number of engine revolutions per minute is decreased according to the degree of increase/decrease corresponding thereto.

The control unit, when the setting value of the drive ability factor is updated, may control the sensing unit to measure the bio-signal of the user, acquire emotion state information related to the user on the basis of the bio-signal measured after the updating of the setting value, compare the emotion state information acquired after the updating of the setting value with the emotion state information acquired before the updating of the setting value, and adjust the degree of increase/decrease of the setting value according to the type of the drive ability factor.

Various aspects of the present invention are directed to providing a method of controlling a vehicle, the method including: measuring an acceleration of a vehicle and a bio-signal of a user; acquiring emotion state information indicating an emotion state of the user on the basis of the measured bio-signal when the measured acceleration is greater than or equal to a threshold acceleration; and on the basis of the emotion state information and correlation information indicating a relationship between the emotion state information and a drive ability factor related to a drive ability according to a speed change of the vehicle, updating a setting value of the drive ability factor.

The emotion state information may include at least one type of a degree of positive to a speed responsiveness of the vehicle, a degree of positive to a speed linearity of the vehicle, and a degree of positive to a speed acceleration capability of the vehicle and a degree of negative to the speed change of the vehicle.

The updating of the setting value of the drive ability factor may include performing updating such that the degree of positive to the emotion state information is increased or the degree of negative to the emotion state information is decreased.

The drive ability factor may include at least one type of acceleration, a change rate in the acceleration, a number of engine revolutions per minute, and an engine torque of the vehicle.

The correlation information may include information indicating a drive ability factor corresponding to the type of the emotion state information and information indicating a degree of increase/decrease of the setting value according to the type of the drive ability factor.

The updating of the drive ability factor may include: determining at least one drive ability factor corresponding to the type of the emotion state information on the basis of the correlation information; and updating the setting value of the determined drive ability factor according to the degree of increase/decrease corresponding thereto.

The updating of the drive ability factor may include: when the degree of positive to the speed responsiveness is determined to be equal to or less than a predetermined threshold value, determining the change rate in the acceleration or the number of engine revolutions per minute as the at least one drive ability factor corresponding to the degree of positive to the speed responsiveness; and performing updating such that the change rate of acceleration is increased according to the degree of increase/decrease corresponding thereto or the number of engine revolutions per minute is increased/decreased according to the degree of increase/decrease corresponding thereto.

The updating of the drive ability factor may include: when the degree of positive to the speed acceleration capability is determined to be equal to or less than a predetermined threshold value, determining the change rate in the acceleration or the engine torque as the at least one drive ability factor corresponding to the degree of positive to the speed acceleration capability; and performing updating such that the change rate in the acceleration is increased according to the degree of increase/decrease corresponding thereto or the engine torque is increased/decreased according to the degree of increase/decrease corresponding thereto.

The updating of the drive ability factor may include: when the degree of positive to the speed linearity is determined to be equal to or less than a predetermined threshold value or the degree of negative to the speed change is determined to be higher than or equal to a predetermined threshold value, determining the acceleration or the number of engine revolutions per minute as the at least one drive ability factor corresponding thereto; and performing updating such that the acceleration is decreased according to the degree of increase/decrease corresponding thereto or the number of engine revolutions per minute is decreased according to the degree of increase/decrease corresponding thereto.

The method may further include: measuring the bio-signal of the user when the setting value of the drive ability factor is updated; acquiring emotion state information related to the user on the basis of the bio-signal measured after the updating of the setting value; and comparing the emotion state information acquired after the updating of the setting value with the emotion state information acquired before the updating of the setting value, to adjust the degree of increase/decrease of the setting value according to the type of the drive ability factor.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a diagram illustrating correlation information between a bio-signal and an emotion factor according to an exemplary embodiment of the present invention.

FIG. 4 is a diagram illustrating emotion state information according to an exemplary embodiment of the present invention.

FIG. 5 is a diagram illustrating correlation information between emotion state information and a drive ability factor according to an exemplary embodiment of the present invention.

FIG. 8 is a graph showing an update of correlation information between emotion state information and a drive ability factor according to an exemplary embodiment of the present invention.

FIG. 9 is a flowchart of a method of controlling a vehicle, which shows updating a setting value of a drive ability factor.

Figure 1:
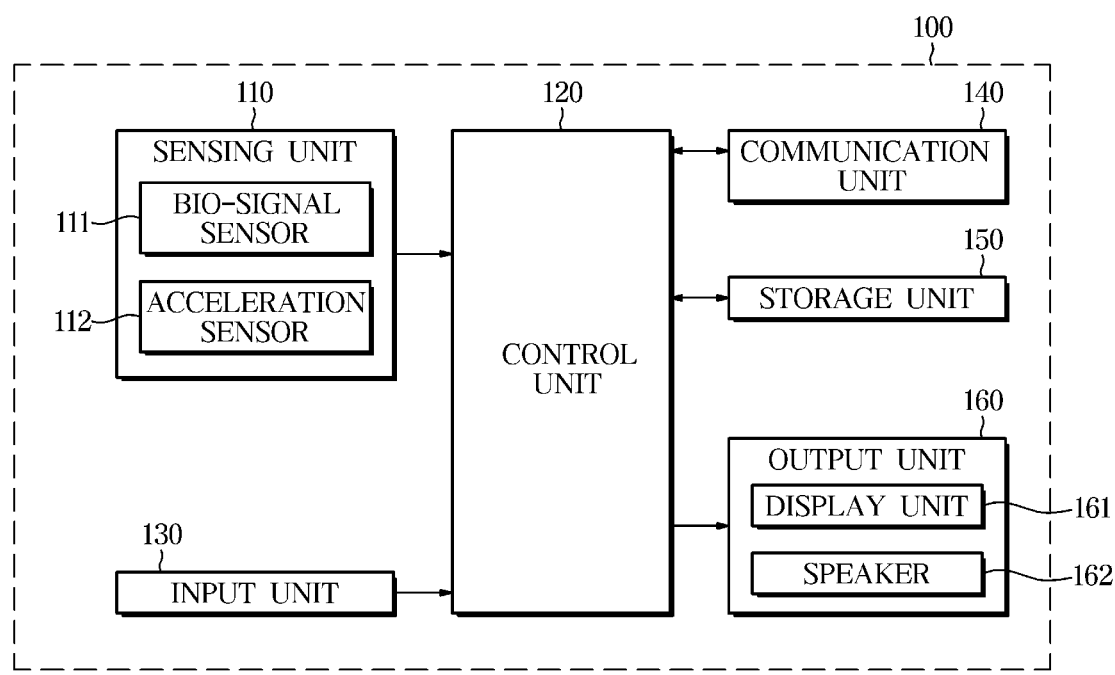
FIG. 1 is a control block diagram illustrating a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like numerals refer to like elements throughout the specification. Not all elements of embodiments of the present invention will be described, and description of what are commonly known in the art or what overlap each other in the exemplary embodiments will be omitted.

It will be further understood that the term "connect" or its derivatives refer both to direct and indirect connection, and the indirect connection may include a connection over a wireless communication network.

It will be further understood that the terms "comprises" and/or "comprising," when used in the present specification, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise.

The terms, such as "~part", "~device", "~block", "~member", "~module", and the like may refer to a unit of processing at least one function or act. For example, the terms may refer to at least process processed by at least one hardware, such as field-programmable gate array (FPGA)/application specific integrated circuit (ASIC), software stored in memories, or processors.

Reference numerals used for method operations are just used to distinguish each operation, but not to limit an order of the operations. Thus, unless the context clearly dictates otherwise, the written order may be practiced otherwise.

Hereinafter, a vehicle and a control method for the same will be described with reference to the accompanying drawings.

FIG. 1 is a control block diagram illustrating a vehicle 100 according to an exemplary embodiment of the present invention.

Referring to FIG. 1, the vehicle 100 according to the exemplary embodiment includes a sensing unit 110 configured to measure an acceleration of the vehicle 100 and a bio-signal of a user, and a control unit 120 configured to determine emotion state information indicating an emotion state of the user on the basis of the measured bio-signal and update a setting value of a drive ability factor related to a drive ability according to a change in vehicle speed, an input unit 130 configured to receive an input of the user, a communication unit 140 configured to perform communication with an external server, a storage unit 150 configured to store correlation information indicating a relationship between the drive ability factor and the emotion state information, and an output unit 160 configured to visually or audibly output a message indicating that the setting value of the drive ability factor has been updated.

The sensing unit 110 includes a bio-signal sensor 111 for measuring a bio-signal of a user of the vehicle 100 and an acceleration sensor 112 for measuring an acceleration of the vehicle 100.

The sensing unit 110 may measure a bio-signal of the user using the bio-signal sensor 111, and may transmit the measured bio-signal to the control unit 120.

Accordingly, the control unit 120 may acquire emotion state information indicating an emotion state of the user on the basis of the bio-signal of the user measured through the bio-signal sensor 111.

The bio-signal of the user may include at least one of a facial expression, a physical state, a state of eyes, and a state of voice of the user.

Accordingly, the bio-signal sensor 111 may be provided in the vehicle 100 as various sensors for measuring the user's bio-signal.

For example, a galvanic skin response (GSR) meter for measuring a state of skin of the user, a heart rate (HR) meter for measuring a heart rate of the user, an eglectroencephalogram (EEG) meter for measuring a brain wave of the user, a facial analysis device configured for analyzing a facial expression of the user, a microphone device configured for analyzing a state of voice of the user, and an eye tracker for tracking the position of eyeballs of the user.

Furthermore, the implementation of the bio-sensor 111 is not limited to the sensors described above, and the bio-sensor 111 may be provided in various sensors as long as it can measure bio-signals of a human.

The sensing unit 110 may measure the acceleration of the vehicle 100 using the acceleration sensor 112 provided in the vehicle 100 and may transmit the measured acceleration to the control unit 120.

Accordingly, the control unit 120 may determine whether the vehicle 100 is accelerating or decelerating on the basis of the acceleration measured by the acceleration sensor 112 and may update a setting value of a drive ability factor on the basis of emotion state information at the time of acceleration or deceleration of the vehicle 100.

The control unit 120 according to the exemplary embodiment acquires emotion state information indicating an emotion state of the user on the basis of the measured bio-signal, and updates a setting value of a drive ability factor related to a drive ability according to a speed change of the vehicle 100.

The control unit 120 may acquire the emotion state information indicating the emotion state of the user on the basis of the bio-signal measured by the sensing unit 110 when the acceleration of the vehicle 100 measured by the sensing unit 110 is equal to or greater than a predetermined threshold acceleration.

According to embodiments, the threshold acceleration may be set to 0 such that only when the vehicle 100 travels with acceleration, the control unit 120 acquires the emotion state information indicating the emotion state of the user on the basis of the bio-signal measured by the sensing unit 110. That is, only upon occurrence of a speed of the vehicle 100, the control unit 120 according to the exemplary embodiment may acquire the emotion state information indicating the emotion state of the user on the basis of the bio-signal measured from the sensing unit 110.

The emotional state information may include at least one type of the degree of positive to a speed responsiveness of the vehicle 100, the degree of positive to a speed linearity of the vehicle 100, the degree of positive to a speed acceleration capability of the vehicle 100, and the degree of negative to a speed change of the vehicle 100. The acquisition of the emotion state information will be described in detail below.

The control unit 120 may update the setting value of the drive ability factor on the basis of the emotion state information and correlation information indicating a relationship between the emotion state information and the drive ability factor related to the drive ability according to the speed change of the vehicle 100.

In detail, the control unit 120 may update the setting value of the drive ability factor such that the degree of positive to the emotion state information is increased. Alternatively, the control unit 120 may update the setting value of the drive ability factor such that the degree of negative to the emotion state information is decreased.

The drive ability factor is related to the drive ability according to the speed change of the vehicle 100, and may include at least one type of acceleration, the change rate in the acceleration, the number of engine revolutions per minute, and an engine torque of the vehicle 100.

The drive ability according to the speed change of the vehicle 100 may indicate the acceleration performance of the vehicle 100, and may include a speed responsiveness indicating how fast a desired speed is reached according to a user's intention, a speed linearity indicating how linear or stable the speed is changed according to a user's intention, and an acceleration capability indicating whether acceleration or deceleration is achieved according to a user's intention.

The drive ability factor is a factor that exerts an influence on the drive ability according to the speed change of the vehicle 100, and may include at least one type of acceleration, the change rate in the acceleration, the number of engine revolutions per minute, and the engine torque of the vehicle 100 as described above.

However, the drive ability factor is not limited to the above and may be variously implemented as long as it can exert an influence on the drive ability according to the speed change of the vehicle 100.

The correlation information between the emotion state information and the drive ability factor includes information indicating a drive ability factor corresponding to the type of the emotion state information and information indicating the degree of increase/decrease of the setting value according to the type of the drive ability factor.

Accordingly, the control unit 120 may determine at least one drive ability factor corresponding to the type of the emotion state information on the basis of the correlation information between the emotion state information and the drive ability factor, and update the setting value of the determined drive ability factor according to the degree of increase/decrease corresponding thereto. The updating of the setting value of the drive ability will be described in detail below.

Furthermore, control unit 120 may control the sensing unit 110 to measure the bio-signal of the user when the setting value of the drive ability factor is updated.

Accordingly, the sensing unit 110 may measure the bio-signal of the user after the setting value of the drive ability factor is updated.

The control unit 120 may acquire the emotion state information related to the user on the basis of the bio-signal of the user measured after the setting value of the drive ability factor is updated.

The control unit 120 may compare the emotion state information acquired after the setting value of the drive ability factor is updated with the emotion state information acquired before the setting value of the drive ability factor is updated.

The control unit 120 may adjust the degree of increase/decrease of the setting value according to the type of the drive ability factor on the basis of a result of the comparison. The adjustment of the degree of increase/decrease of the setting value according to the type of the drive ability factor will be described in detail below.

The control unit 120 may include at least one memory for storing a program for performing the above described operation and the following operations to be described, and at least one processor for executing the stored programs. When the memory and the processor are each provided in a plurality of units thereof, the plurality of memories and the plurality of processors may be integrated in a single chip, or may be provided at positions physically separated from each other.

The input unit 130 according to the exemplary embodiment may receive an input from a user.

In detail, the input unit 130 may receive an input regarding a threshold acceleration for updating the setting value of the drive ability factor from the user. That is, the user may adjust the sensitivity about updating the setting value of the drive ability factor by changing the predetermined threshold acceleration through the input unit 130.

However, according to embodiments, the threshold acceleration may be set to 0 such that only when the vehicle 100 travels with acceleration, the control unit 120 may acquire the emotion state information indicating an emotion state of the user on the basis of the bio-signal measured by the sensing unit 110. That is, only upon occurrence of a speed of the vehicle 100, the control unit 120 according to the exemplary embodiment may acquire the emotion state information indicating the emotion state of the user on the basis of the bio-signal measured from the sensing unit 110.

Furthermore, the input unit 130 may receive an input regarding the correlation information between the emotion state information and the drive ability factor from the user. In detail, the input unit 130 may receive an input indicating a change of the drive ability factor corresponding to the type of the emotion state information from the user, and may receive an input indicating a change of the degree of increase/decrease of the setting value according to the type of the drive ability factor from the user.

That is, the user may change the predetermined correlation information through the input unit 130 such that the setting value of the drive ability factor desired by the user is updated.

Accordingly, the control unit 140 may update the setting value of the drive ability factor on the basis of the changes of the threshold acceleration and the correlation information received through the input unit 130.

The input unit 130 may be provided in a center fascia mounted at the center portion of a dashboard and may be implemented using a physical button, a knob, a touch pad, a touch screen, a stick type manipulation device, a track ball, or the like. However, the position and the method of implementation of the input unit 130 are not limited to the above-described example, and may be included without limitation as long as they can implement the receiving of a user's input.

The communication unit 140 according to the exemplary embodiment performs communication with an external server. In detail, the communication unit 140 may receive the information related to the threshold acceleration and the correlation information between the emotion state information and the drive ability factor from the external server.

Accordingly, the control unit 140 may update the setting value of the drive ability factor on the basis of the threshold acceleration and the correlation information received through the communication unit 140.

Accordingly, the communication unit 140 may perform communication with an external server using various methods. The communication unit 140 may transmit and receive information to/from the external server using various methods such as radio frequency (RF) communication, wireless fidelity (Wi-Fi) communication, Bluetooth communication, Zigbee communication, near field communication (NFC), ultra-wide band (UWB) communication, and the like. The method of performing communication with an external server is not limited to the above-described methods and may be variously implemented as long as it allows communication with an external server.

Although the communication unit 140 is illustrated as a single component that transmits and receives signals, the present invention is not limited thereto. For example, a transmitting unit for transmitting signals and a receiving unit for receiving signals may be separately provided.

The storage unit 150 according to the exemplary embodiment may store information related to a threshold acceleration, correlation information between emotion state information and a drive ability factor, and correlation information between a bio-signal and an emotion factor, and may also store various pieces of information related to the vehicle 100.

To the present end, the storage unit 150 may include a nonvolatile memory device, such as a cache, a read only memory (ROM), a programmable ROM (PROM), an erasable programmable ROM (EPROM), an electrically erasable programmable ROM (EEPROM), and a flash memory; a volatile memory device, such as a random access memory (RAM); or other storage media, such as a hard disk drive (HDD), a CD-ROM, and the like, but the implementation of the storage unit 150 is not limited thereto.

The output unit 160 according to the exemplary embodiment may visually or audibly output a message indicating that the setting value of the drive ability factor has been updated according to the control of the control unit 120. Accordingly, the user may recognize that the setting value of the drive ability factor of the vehicle 100 has been updated.

In detail, the output unit 160 may include a display unit 161 that visually outputs a message indicating that the setting value of the drive ability factor has been updated.

The display unit 161 may be provided inside the vehicle 100 and include a panel which is implemented using one of a cathode ray tube (CRT) panel, a liquid crystal display (LCD) panel, a light emitting diode (LED) panel, an organic light emitting diode (OLED, a plasma display panel (PDP), AND a field emission display (FED) panel.

Furthermore, the output unit 160 may include a speaker 162 for audibly outputting a message indicating that the setting value of the drive ability factor has been updated, and the speaker 162 may be provided inside the vehicle 100.

Figure 2:
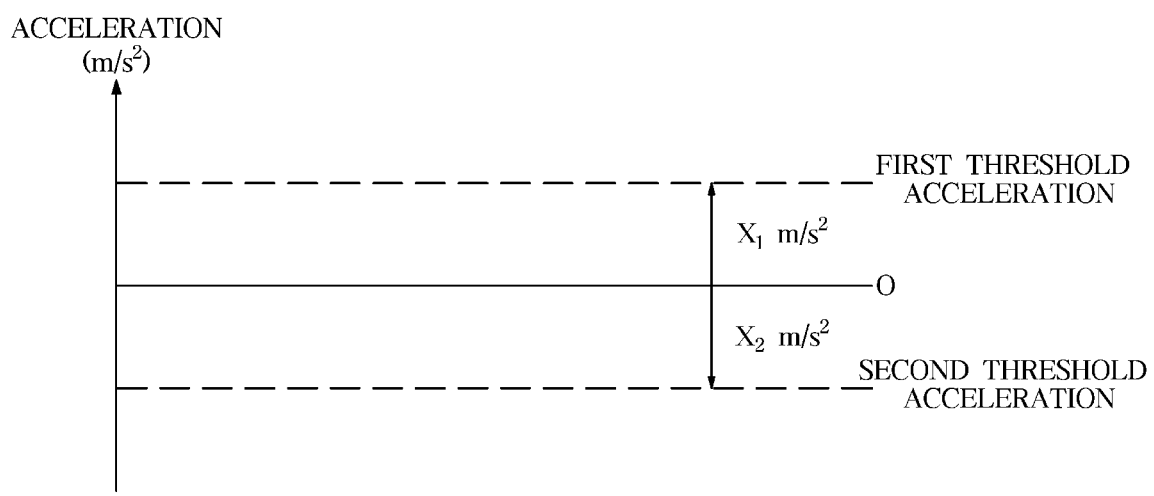
FIG. 2 is a diagram illustrating threshold acceleration for updating a drive ability factor according to an exemplary embodiment of the present invention.

FIG. 2 is a diagram illustrating threshold acceleration for updating a drive ability factor according to an exemplary embodiment of the present invention.

Referring to FIG. 2, the sensing unit 110 according to the exemplary embodiment may measure the acceleration of the vehicle 100 using the acceleration sensor 112 provided in the vehicle 100, and may transmit the measured acceleration to the control unit 120.

The control unit 120 may determine whether the vehicle 100 is accelerating or decelerating on the basis of the acceleration measured by the acceleration sensor 112, and may update the setting value of the drive ability factor on the basis of the emotion state information at the time of acceleration or deceleration of the vehicle 100.

In detail, the control unit 120 may acquire the emotion state information indicating the emotion state of the user on the basis of the bio-signal measured by the sensing unit 110 when the acceleration of the vehicle 100 measured by the sensing unit 110 is equal to or greater than a predetermined threshold acceleration.

For example, at a time of acceleration of the vehicle 100, the control unit 120 may acquire the emotion state information indicating the emotion state of the user on the basis of the bio-signal measured by the sensing unit 110 when the vehicle 100 has an acceleration in a direction of increasing the speed which is equal to or greater than a first threshold acceleration of X1 m/s2.

Furthermore, at a time of deceleration of the vehicle 100, the control unit 120 may acquire the emotion state information indicating the emotion state of the user on the basis of the bio-signal measured by the sensing unit 110 when the vehicle 100 has an acceleration in a direction of decreasing the speed which is equal to or greater than a second threshold acceleration of X2 m/s2.

The threshold acceleration including the first threshold acceleration and the second threshold acceleration may be a predetermined acceleration which is previously set in the designing stage for updating the setting value of the drive ability factor that exerts an influence on the drive ability.

That is, the threshold acceleration may represent the minimum value of the acceleration at which the updating of the setting value of the drive ability factor exerting an influence on the drive ability is required, and at which the drive ability is subject to a change by the setting value of the drive ability factor.

Furthermore, the threshold acceleration may be changed on the basis of the input of the user received through the input unit 130. That is, the user may adjust the sensitivity about updating the setting value of the drive ability factor by changing the predetermined threshold acceleration through the input unit 130.

According to embodiments, the threshold acceleration may be set to 0 such that only when the vehicle 100 travels with acceleration, the control unit 120 may acquire the emotion state information indicating the emotion state of the user on the basis of the bio-signal measured by the sensing unit 110. That is, only upon occurrence of a speed of the vehicle 100, the control unit 120 according to the exemplary embodiment may acquire the emotion state information indicating the emotion state of the user on the basis of the bio-signal measured from the sensing unit 110.

FIG. 3 is a diagram illustrating correlation information 300 between a bio-signal and an emotion factor according to an exemplary embodiment of the present invention, and FIG. 4 is a diagram illustrating emotion state information 400 according to an exemplary embodiment of the present invention.

Referring to FIG. 3, the control unit 120 may acquire emotion state information indicating an emotion state of the user using a bio-signal of the user measured by the sensing unit 110 together with the correlation information 300 between the bio-signal and the emotion factor stored in the storage unit 150.

A galvanic skin response (GSR) signal has a correlation value of 0.875 with a disgust emotion factor and has a correlation value of 0.775 with an anger emotion factor, respectively, showing a high relevance to the disgust emotion factor and the anger emotion factor. Accordingly, the user's bio-signal collected by a GSR meter is configured as a criterion for determining that the user's emotion is an anger or a disgust.

The correlation value of the GSR signal with a joy emotion factor is 0.353, which is relative low value, showing that the joy emotion factor is less relevant to the GSR signal.

Furthermore, an electroencephalogram (EEG) signal has a correlation value of 0.864 with an anger emotion factor and has a correlation value of 0.878 with a fear emotion factor, showing a high relevance to the anger emotion factor and the fear emotion factor. Accordingly, the user's bio-signal collected by an EEG meter is configured as a criterion for determining that the user's emotion is an anger or a fear.

Since the information shown in FIG. 3 is only an experiment result, it may vary depending on the experimental environment.

In the present way, the control unit 120 may acquire the emotion state information related to the user using the correlation information 300 between the bio-signal of the user and the emotion factor.

The emotional state information may include at least one type of: the degree of positive to a speed responsiveness of the vehicle 100, the degree of positive to a speed linearity of the vehicle 100, and the degree of positive to a speed acceleration capability of the vehicle 100 and the degree of negative to a speed change of the vehicle 100.

The degree of positive to the speed responsiveness of the vehicle 100 indicates the degree of user's satisfaction regarding the speed responsiveness indicating how fast a desired speed is reached according to a user's intention, and the degree of positive to the speed linearity of the vehicle 100 indicates the degree of user's satisfaction regarding the speed linearity indicating how linear or stable the speed is changed according to a user's intention.

Furthermore, the degree of positive to the speed acceleration capability of the vehicle 100 indicates the degree of user's satisfaction regarding the speed acceleration capability indicating whether acceleration or deceleration is achieved according to a user's intention, and the degree of negative to the speed change of the vehicle 100 indicates the degree of user's dissatisfaction according to a surprise and a panic felt by the user at a time of acceleration or deceleration.

The control unit 120 may distinguish the emotion factor corresponding to each type of emotion state information, and on the basis of the relatedness of each emotion factor with the emotion state of the user, may acquire the degree of positive or the degree of negative to the type of emotion state information.

To the present end, the storage unit 150 may store information indicating the relationship between the type of the emotion state information and the emotion factor, and the relationship between the type of the emotion state information and the emotion factor may be set in the designing stage.

For example, the control unit 120, in a response to determining the emotion of the user to be a satisfaction or a joy using the bio-signal of the user measured by the sensing unit 110 and the correlation information 300 between the bio-signal and the emotion factor stored in the storage unit 150, may determine that the user has a high degree of positive to the speed responsiveness of the vehicle 100.

On the other hand, the control unit 120, in a response to determining the emotion of the user to be a dissatisfaction or boredom, may determine that the user has a low degree of positive to the speed responsiveness of the vehicle 100.

Furthermore, the control unit 120, in a response to determining the emotion of the user to be a satisfaction or an interest using the bio-signal of the user and the correlation information 300 between the bio-signal and the emotion factor, may determine that the user has a high degree of positive to the speed acceleration capability of the vehicle 100.

On the other hand, the control unit 120, in a response to determining the emotion of the user to be a dissatisfaction or an anger, may determine that the user has a low degree of positive to the speed acceleration capability of the vehicle 100.

Furthermore, the control unit 120, in a response to determining the emotion of the user to be a satisfaction or an neutral using the bio-signal of the user and the correlation information 300 between the bio-signal and the emotion factor, may determine that the user has a high degree of positive to the speed linearity of the vehicle 100.

On the other hand, the control unit 120, in a response to determining the emotion of the user to be a dissatisfaction or a fear, may determine that the user has a low degree of positive to the speed linearity of the vehicle 100.

Furthermore, the control unit 120, in a response to determining the emotion of the user to be a satisfaction or a neutral using the bio-signal of the user and the correlation information 300 between the bio-signal and the emotion factor, may determine that the user has a low degree of negative to the speed change of the vehicle 100.

On the other hand, the control unit 120, in a response to determining the emotion of the user to be a disgust, an anger, a dissatisfaction, a distress, or a fear, may determine that the user has a high degree of negative to the speed change of the vehicle 100.

Although some examples of the emotion for determining the degree of positive or the degree of negative according to the type of emotion state information have been described above, the present invention is not limited thereto and may include various emotions as long as it may be used to determine the degree of positive or the degree of negative according to the type of emotion state information.

Furthermore, the control unit 120 may determine a relatedness of each emotion factor with an emotion state of the user on the basis of the signal intensity of each bio-signal, and may acquire each type of emotion state information as a quantitative value on the basis of the relatedness of the emotion factor with the emotion state of the user.

For example, the control unit 120 may acquire the degree of positive to the speed responsiveness of the vehicle 100 and the degree of positive to the speed acceleration capability of the vehicle 100 as a quantitative value between 0 and 100 according to a ratio of the relatedness of a satisfaction factor or a joy factor with a user's emotion state to the relatedness of a dissatisfaction factor or a boredom factor with a user's emotion state.

In the present way, the control unit 120 may acquire each type of emotion state information as a quantitative value.

FIG. 4 is a diagram illustrating the emotion state information 400 according to the exemplary embodiment of the present invention. The emotion state information 400 represents each type of emotion state information as a quantitative value. Referring to FIG. 4, the degree of positive to the speed responsiveness has a quantitative value of 40, and the degree of positive to the speed acceleration capability has a quantitative value of 60. The degree of positive to the speed linearity has a quantitative value of 65, and the degree of negative to the speed change has a quantitative value of 25.

As described above, the emotion state information acquired by the control unit 120 may be represented by a quantitative value according to the type thereof. FIG. 4 is merely exemplified for the purposes of describing the present invention, and the quantitative value for each piece of emotion state information may vary depending on the emotion state of the user.

The control unit 120 according to the exemplary embodiment of the present invention may update the setting value of the drive ability factor when the degree of positive of the emotion state information 400 is lower than a predetermined threshold value or the degree of negative of the emotion state information 400 is higher than a predetermined threshold value.

That is, when the degree of positive of the emotion state information 400 is lower than a predetermined threshold value, the control unit 120 may update the setting value of the drive ability factor such that the degree of positive of the emotion state information 400 is increased.

Furthermore, when the degree of negative of the emotion state information 400 is lower than a predetermined threshold value, the control unit 120 may update the setting value of the drive ability factor such that the degree of negative of the emotion state information 400 is decreased.

The predetermined threshold value corresponding to each type of emotion state information 400 may be a predetermined acceleration previously set in the designing stage for updating the setting value of the drive ability factor that exerts an influence on the drive ability.

That is, the predetermined threshold value corresponding to each type of emotion state information 400 corresponds to the degree of positive or the degree of negative of the emotion state information 400 in which update of the setting value of the drive ability factor affecting the drive ability is required, or in which the drive ability is subject to a change according to the setting value of the drive ability factor.

Furthermore, the predetermined threshold value corresponding to each type of emotion state information 400 may be changed on the basis of the input of the user received through the input unit 130. That is, the user may adjust the sensitivity about updating the setting value of the drive ability factor by changing the predetermined threshold value corresponding to each type of emotion state information 400 through the input unit 130.

FIG. 5 is a diagram illustrating correlation information 500 between the emotion state information 400 and a drive ability factor according to an exemplary embodiment of the present invention.

Referring to FIG. 5, the correlation information 500 between the emotion state information 400 and the drive ability factor includes information indicating drive ability factors corresponding to the types of the emotion state information 400, and information indicating the degrees of increase/decrease of setting values according to the types of the drive ability factors.

The drive ability factor is related to the drive ability according to the speed change of the vehicle 100, and may include at least one type of acceleration, a change rate in the acceleration, the number of engine revolutions per minute, and an engine torque of the vehicle 100.

The drive ability according to the speed change of the vehicle 100 indicates the acceleration performance of the vehicle 100, and may include a speed responsiveness indicating how fast a desired speed is reached according to a user's intention, a speed linearity indicating how linear or stable the speed is changed according to a user's intention, and an acceleration capability indicating whether acceleration or deceleration is achieved according to a user's intention.

The drive ability factor is a factor that exerts an influence on the drive ability according to the speed change of the vehicle 100, and may include at least one type of acceleration, the change rate in the acceleration, the number of engine revolutions per minute, and the engine torque of the vehicle 100 as described above.

The acceleration of the vehicle 100 represents a speed change of the vehicle with time when the vehicle 100 accelerates or decelerates, and the change rate of acceleration of the vehicle 100 represents a change in the acceleration of the vehicle 100 with time.

The number of engine revolutions per minute of the vehicle 100 represents the number of revolutions at which a crankshaft of the engine provided in the vehicle 100 rotates for one minute, and the engine torque of the vehicle 100 represents a force that rotates the crankshaft.

In detail, the degree of positive to the speed responsiveness among the types of emotion state information 400 may correspond to the change rate in the acceleration or the number of engine revolutions per minute among the types of the drive ability factors, and the degree of positive to the speed acceleration capability among the types of emotion state information 400 may correspond to the change rate in the acceleration or the engine torque among the types of the drive ability factors.

Furthermore, the degree of positive to the speed linearity among the types of emotion state information 400 may correspond to the acceleration or the number of engine revolutions per minute among the types of the drive ability factors, and the degree of negative to the speed change may correspond to the acceleration or the number of engine revolutions per minute among the types of the drive ability factors.

Furthermore, the correlation information 500 between the emotion state information 400 and the drive ability factor includes information indicating the degree of increase/decrease of the setting value according to the type of the drive ability factor. Accordingly, the control unit 120 may determine the type of the drive ability factor corresponding to the type of the emotion state information 400, and update the setting value of the drive ability factor according to the degree of increase/decrease corresponding to the determined type of the drive ability factor.

The setting value according to the type of the drive ability factor may be previously set in the design stage and may be changed according to the input of the user received through the input unit 130.

Furthermore, the setting value according to the type of drive ability factor may be updated on the basis of the emotion state information 400 of the user before and after the update. The adjustment of the degree of increase/decrease of the setting value according to the type of the drive ability factor will be described in detail below.

Figure 6:
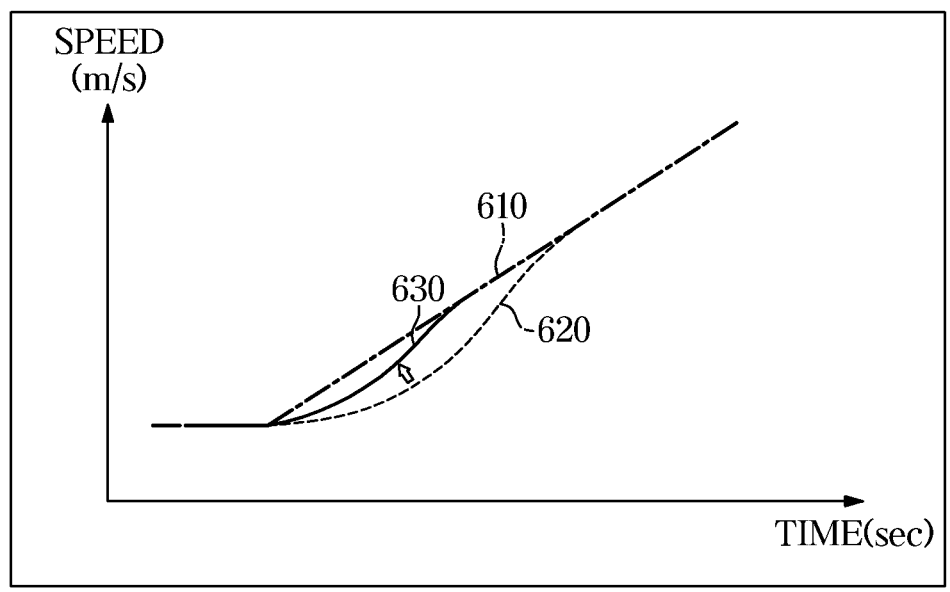
FIG. 6 is a graph showing a vehicle speed subsequent to updating a setting value of a drive ability factor according to an exemplary embodiment of the present invention.
Figure 7:
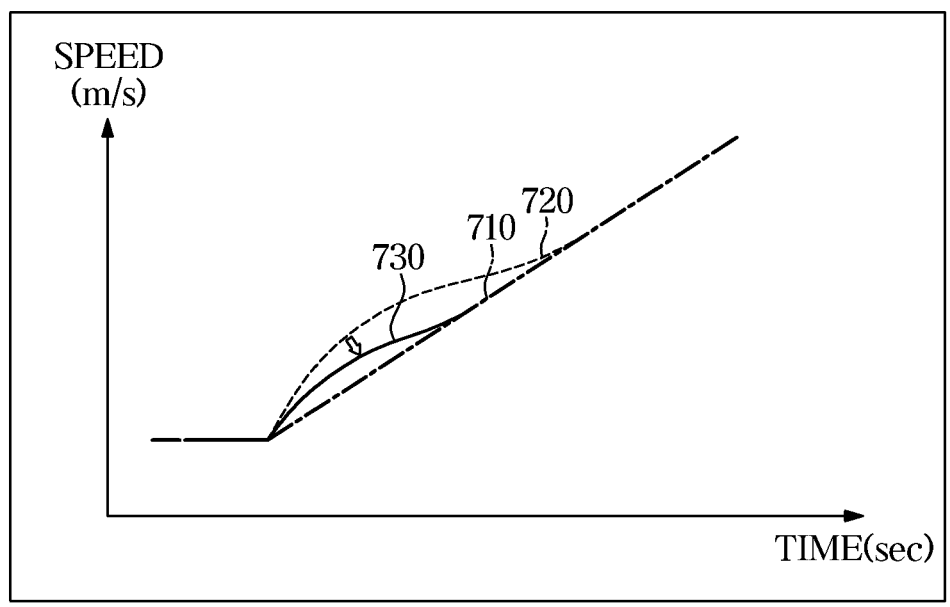
FIG. 7 is a graph showing a vehicle speed subsequent to updating a setting value of a drive ability factor according to another exemplary embodiment of the present invention.

FIG. 6 is a graph showing a vehicle speed of the vehicle 100 subsequent to updating a setting value of a drive ability factor according to an exemplary embodiment of the present invention, and FIG. 7 is a graph showing a vehicle speed of the vehicle 100 subsequent to updating a setting value of a drive ability factor according to another exemplary embodiment of the present invention.

Referring to FIG. 6 and FIG. 7, the control unit 120 determines at least one drive ability factor corresponding to the type of the emotion state information 400 on the basis of the correlation information 500 between the emotion state information 400 and the drive ability factor, and may update the setting value of the determined drive ability factor according to the degree of increase/decrease corresponding thereto.

In detail, when the degree of positive to the speed responsiveness is determined to be equal to or less than a predetermined threshold value, the control unit 120 determines the change rate in the acceleration or the number of engine revolutions per minute as at least one drive ability factor corresponding to the degree of positive to the speed responsiveness, and may perform the updating such that the change rate in the acceleration is increased according to the degree of increase/decrease corresponding thereto or the number of engine revolutions per minute is increased according to the degree of increase/decrease corresponding thereto.

When the degree of positive to the speed acceleration capability is determined to be equal to or less than a predetermined threshold value, the control unit 120 determines the change rate in the acceleration or the engine torque as at least one drive ability factor corresponding to the degree of positive to the speed acceleration capability, and may perform the updating such that the change rate in the acceleration is increased according to the degree of increase/decrease corresponding thereto or the engine torque is increased/decreased according to the degree of increase/decrease corresponding thereto.

Furthermore, when the degree of positive to the speed linearity is determined to be equal to or less than a predetermined threshold value or the degree of negative to the speed change is equal to or greater than a predetermined threshold value, the control unit 120 determines the acceleration or the number of engine revolutions per minute as at least one drive ability factor corresponding thereto, and may perform the updating such that the acceleration is decreased according to the degree of increase/decrease corresponding thereto or the number of engine revolutions per minute is decreased according to the degree of increase/decrease corresponding thereto.

FIG. 6 shows the speed of the vehicle 100 when an acceleration in a direction of increasing the speed is intended by the user of the vehicle 100.

A speed 610 desired by the user may be a speed that constantly increases over time as shown in FIG. 6.

A speed 620 before an update of a setting value of a drive ability factor is lower than the speed 610 intended by the user because the acceleration at the moment of initiating the speed increase is lower than an intended acceleration.

Accordingly, the user of the vehicle 100 may feel dissatisfaction or boredom, and the control unit 120 may determine that the degree of positive to the speed responsiveness among the types of the emotion state information 400 is equal to or less than a predetermined threshold value on the basis of the bio-signal of the user.

The control unit 120, in a response to determining that the degree of positive to the speed responsiveness is determined to be equal to or less than a predetermined threshold value, may determine the change rate in the acceleration or the number of engine revolutions per minute as at least one drive ability factor corresponding to the degree of positive to the speed responsiveness, and perform the updating such that the change rate in the acceleration is increased according to the degree of increase/decrease corresponding thereto or the number of engine revolutions per minute is increased according to the degree of increase/decrease corresponding thereto.

As a result, it may be seen that a speed 630 after the updating of the setting value of the drive ability factor converges to the intended speed 610 faster than the speed 620 before the updating of the setting value of the drive ability factor.

According to the updating of the setting value of the drive ability factor, the speed of the vehicle 100 may reach the intended speed more rapidly. That is, the speed responsiveness of the vehicle 100 is improved by updating the setting value of the drive ability factor.

Accordingly, the user of the vehicle 100 may feel more satisfied or pleasant, and feel less unsatisfactory or less boring compared to when the setting value of the drive ability factor is not updated. Accordingly, the degree of positive to the speed responsiveness of the user may be increased.

Furthermore, as shown in FIG. 6, the acceleration at the moment of initiating the speed increase is lower than the intended acceleration.

Accordingly, the user of the vehicle 100 may feel dissatisfied or angry. The control unit 120 may determine that the degree of positive to the speed acceleration capability among the types of the emotion state information 400, which indicates whether acceleration or deceleration is achieved by the intention of the user, is equal to or less than a predetermined threshold value on the basis of the bio-signal of the user.

The control unit 120, in a response to determining that the degree of positive to the speed acceleration capability is determined to be equal to or less than the predetermined threshold value, may determine the change rate in the acceleration or the engine torque as at least one drive ability factor corresponding to the degree of positive to the speed acceleration capability, and perform the updating such that the change rate in the acceleration is increased according to the degree of increase/decrease corresponding thereto or the engine torque is increased according to the degree of increase/decrease corresponding thereto.

As a result, it may be seen that the acceleration after the updating of the setting value of the drive ability factor converges to the intended acceleration faster than the acceleration before the updating of the setting value of the drive ability factor.

According to the updating of the setting value of the drive ability factor, the acceleration of the vehicle 100 may reach the intended acceleration more rapidly. That is, the speed acceleration capability of the vehicle 100 is improved by updating the setting value of the drive ability factor.

Accordingly, the user of the vehicle 100 may feel more satisfied or interested and feel less unsatisfactory or less angry compared to when the setting value of the drive ability factor is not updated. Accordingly, the degree of positive to the speed acceleration capability of the user may be increased, and the degree of negative to the speed change of the user may be decreased.

Although not shown in FIG. 6, the control unit 120 may update the setting value of the drive ability factor even when an acceleration in a direction of decreasing the speed is intended by the user of the vehicle 100.

In detail, the control unit 120, in a response to the degree of positive to the speed responsiveness being equal to or less than a predetermined threshold value, may determine the change rate in the acceleration or the number of engine revolutions per minute as at least one drive ability factor corresponding to the degree of positive to the speed responsiveness, and perform the updating such that the change rate in the acceleration is increased according to the degree of increase/decrease corresponding thereto or the number of engine revolutions per minute is deceased according to the degree of increase/decrease corresponding thereto.

Furthermore, the control unit 120, in a response to the degree of positive to the speed acceleration capability being equal to or less than a predetermined threshold value, may determine the change rate in the acceleration or the engine torque as at least one drive ability factor corresponding to the degree of positive to the speed acceleration capability, and perform the updating such that the change rate in the acceleration is increased according to the degree of increase/decrease corresponding thereto or the engine torque is decreased according to the degree of increase/decrease corresponding thereto.

FIG. 7 shows the speed of the vehicle 100 when an acceleration in a direction of increasing the speed is intended by the user of the vehicle 100, similar to FIG. 6. As shown in FIG. 7, a speed 720 before the updating of the setting value of the drive ability factor has a value greater than that of an intended speed 710, different from the speed 620 before the updating of the setting value of the drive ability factor shown in FIG. 6.

Furthermore, as shown in FIG. 7, the acceleration before the updating of the setting value of the drive ability has a value greater than an intended acceleration.

That is, a speed 710 desired by the user may be a speed that constantly increases over time as shown in FIG. 7.

The speed 720 before the updating of the setting value of the drive ability factor is higher than the speed 710 intended by the user because the acceleration at the moment of initiating the speed increase is higher than the intended acceleration.

Accordingly, the user of the vehicle 100 may feel dissatisfied or fearful, and the control unit 120 may determine that the degree of positive to the speed linearity among the types of the emotion state information 400 is equal to or less than a predetermined threshold value on the basis of the bio-signal of the user.

Furthermore, the user of the vehicle 100 may feel disgusted, angry, dissatisfied, distressed or fearful, and the control unit 120 may determine the degree of negative to the speed change among the types of the emotional state information 400 of the user is equal to or greater than a predetermined threshold value on the basis of the bio-signal of the user.

The control unit 120, in a response to determining that the degree of positive to the speed linearity is equal to or less than the predetermined threshold value or the degree of negative to the speed change is equal to or greater than the predetermined threshold value, may determine the acceleration or the number of engine revolutions per minute as at least one drive ability factor corresponding to thereto, and perform the updating such that the acceleration is decreased according to the degree of increase/decrease corresponding thereto or the number of engine revolutions per minute is decreased according to the degree of increase/decrease corresponding thereto.

As a result, it may be seen that a speed 730 after the updating of the setting value of the drive ability factor is lowered than the speed 720 before the updating of the setting value of the drive ability factor and converges to the intended speed 710 faster than the speed 720.

Furthermore, according to the updating of the setting value of the drive ability factor, the acceleration of the vehicle 100 is lowered than the acceleration before the updating of the setting value of the drive ability factor, and reaches the intended acceleration more rapidly.

That is, with the updating of the setting value of the drive ability factor, the speed and the acceleration of the vehicle 100 are lowered than the speed and the acceleration before the updating of the setting value of the drive ability factor, improving the speed linearity of the vehicle 100.

Accordingly, the user of the vehicle 100 may feel more satisfied or neutral and may feel less disgusted, angry, dissatisfied, distressed, or fearful compared to before the setting value of the drive ability factor is not updated. Accordingly, the degree of positive to the speed linearity of the user may be increased, and the degree of negative to the speed change of the user may be lowered.

Although not shown in FIG. 7, the control unit 120 may update the setting value of the drive ability factor even when an acceleration in a direction of decreasing the speed is intended by the user of the vehicle 100.

In detail, even when an acceleration in a direction of decreasing the speed is intended by the user of the user, the control unit 120, in a response to the degree of positive to the speed linearity being equal to or less than a predetermined threshold value or the degree of negative to the speed change being equal to or greater than a predetermined threshold value, may determine the acceleration or the number of engine revolutions per minute as the at least one drive ability factor corresponding thereto and perform the updating such that the acceleration is decreased according to the degree of increase/decrease corresponding thereto or the number of engine revolutions per minute is decreased according to the degree of increase/decrease corresponding thereto.

FIG. 8 is a graph showing an update of the correlation information 500 between the emotion state information 400 and the drive ability factor according to an exemplary embodiment of the present invention.

Referring to FIG. 8, the control unit 120 may control the sensing unit 110 to measure the bio-signal of the user when the setting value of the drive ability factor is updated. Accordingly, the sensing unit 110 may measure the bio-signal of the user after the setting value of the drive ability factor is updated.

The control unit 120 may acquire the emotion state information 400 of the user on the basis of the bio-signal of the user measured after the setting value of the drive ability factor is updated.

The control unit 120 may compare the emotion state information 400 acquired after the setting value of the drive ability factor is updated with the emotion state information 400 acquired before the setting value of the drive ability factor is updated.

The control unit 120 may adjust the degree of increase/decrease of the setting value according to the type of the drive ability factor on the basis of the comparison result.

In detail, the control unit 120, when the degree of positive of the emotion state information 400 acquired after the setting value of the drive ability factor is updated has a quantitative value higher than that acquired before the setting value of the drive ability factor is updated, or when the degree of negative of the emotion state information 400 acquired after the setting value of the drive ability factor is updated has a quantitative value lower than that acquired before the setting value of the drive ability factor is updated, may adjust the degree of increase/decrease corresponding to each type of the drive ability factor such that the absolute value of the degree of increase/decrease is reduced.

That is, when the degree of positive of the emotion state information 400 is increased or the degree of negative of the emotion state information 400 of the user is decreased, the vehicle 100 may allow the setting value of the drive ability factor to be not changed in a great range by reducing the absolute value of the degree of increase/decrease of the setting value of the drive ability factor. Accordingly, the user is prevented from having a stress due to a change of the setting value of the drive ability in a great range, while maintaining the situation in which the degree of positive of the emotion state information 400 is increased or the degree of negative of the emotion state information 400 is decreased.

Furthermore, the control unit 120, when the degree of positive of the emotion state information 400 acquired after the setting value of the drive ability factor is updated has a quantitative value lower than that acquired before the setting value of the drive ability factor is updated, or when the degree of negative of the emotion state information 400 acquired after the setting value of the drive ability factor is updated has a quantitative value higher than that acquired before the setting value of the drive ability factor is updated, may adjust the degree of increase/decrease corresponding to each type of the drive ability factor such that the absolute value of the degree of increase/decrease is increased.

That is, when the degree of positive of the emotion state information 400 is decreased or the degree of negative of the emotion state information 400 of the user is increased, the vehicle 100 may allow the setting value of the drive ability factor to be changed in a greater range by increasing the absolute value of the degree of increase/decrease such that the degree of positive of the emotion state information 400 of the user is increased or the degree of negative of the emotion state information 400 of the user is decreased. Accordingly, the user may be satisfied from a change of the setting value of the drive ability factor in a great range, while allowing the degree of positive of the emotion state information 400 to be increased or the degree of negative of the emotion state information 400 to be decreased.

Accordingly, the control unit 120 may adjust the degree of increase/decrease of the setting value according to the type of the drive ability factor by comparing the emotion state information 400 acquired after the setting value of the drive ability factor is updated with the emotion state information 400 acquired before the setting value of the drive ability factor is updated.

That is, the control unit 120 may update the correlation information 500 between the emotion state information 400 and the drive ability factors by adjusting the degree of increase/decrease of the setting value according to the type of the drive ability factor. Correlation information 800 updated as such may include information related to the adjusted degree of increase/decrease of the setting value according to the type of the drive ability factor, and may be stored in the storage unit 150 according to the control of the control unit 120.

Hereinafter, a method of controlling the vehicle 1 according to an exemplary embodiment will be described. The vehicle 1 according to the above-described embodiment may apply to the method of controlling the vehicle 1 described below. Accordingly, the configurations described above with reference to FIG. 1, FIG. 2, FIG. 3, FIG. 4, FIG. 5, FIG. 6, FIG. 7, and FIG. 8 may apply to the method of controlling the vehicle 1 according to the exemplary embodiment without mentioned.

FIG. 9 is a flowchart of a method of controlling the vehicle 100, which shows updating a setting value of a drive ability factor.

Referring to FIG. 9, the vehicle 100 according to the exemplary embodiment may measure an acceleration and a bio-signal of the user (910). In detail, the bio-signal sensor 111 and the acceleration sensor 112 included in the sensing unit 110 of the vehicle 100 may measure the bio-signal of the user and the acceleration of the vehicle 100, respectively.

In detail, when the acceleration of the vehicle 100 is equal to or greater than a predetermined threshold acceleration (YES in operation 920), the vehicle 100 according to the exemplary embodiment may acquire the emotion state information 400 indicating the emotion state of the user on the basis of the bio-signal (930).

In detail, the control unit 120 may acquire the emotion state information 400 indicating the emotion state of the user on the basis of the bio-signal measured by the sensing unit 110 when the acceleration of the vehicle 100 measured by the sensing unit 110 is equal to or greater than a predetermined threshold acceleration.

The emotional state information may include at least one type of: the degree of positive to a speed responsiveness of the vehicle 100, the degree of positive to a speed linearity of the vehicle 100, and the degree of positive to a speed acceleration capability of the vehicle 100 and the degree of negative to a speed change of the vehicle 100.

The vehicle 100 according to the exemplary embodiment may determine the type of the emotion state information 400 when the degree of positive of the emotion state information 400 is less than or equal to a threshold value or the degree of negative of the emotion state information 400 is equal to or greater than a threshold value (940).

In detail, the control unit 120 may compare each of the degree of positive to the speed responsiveness of the vehicle 100, the degree of positive to the speed linearity of the vehicle 100, the degree of positive to the speed acceleration capability of the vehicle 100, and the degree of negative to the speed change of the vehicle 100 with a corresponding threshold value, and may determine the type of the emotion state information 400 when the degree of positive is equal to or lower than the threshold value or the degree of negative is equal or greater than the threshold value.

The control unit 120 may update the setting value of the drive ability factor on the basis of the emotion state information 400 and the correlation information 500 indicating a relationship between the emotion state information 400 and the drive ability factor related to the drive ability according to the speed change of the vehicle 100.

In detail, the control unit 120 may update the setting value of the drive ability factor such that the degree of positive of the emotion state information 400 is increased. Alternatively, the control unit 120 may update the setting value of the drive ability factor such that the degree of negative of the emotion state information 400 is decreased.

The drive ability factor is related to the drive ability according to the speed change of the vehicle 100, and may include at least one type of acceleration, a change rate in the acceleration, the number of engine revolutions per minute, and an engine torque of the vehicle 100.

The drive ability according to the speed change of the vehicle 100 indicates the acceleration performance of the vehicle 100, and may include a speed responsiveness indicating how fast a desired speed is reached according to a user's intention, a speed linearity indicating how linear or stable the speed is changed according to a user's intention, and a speed acceleration capability indicating whether acceleration or deceleration is achieved according to a user's intention.

The drive ability factor is a factor that exerts an influence on the drive ability according to the speed change of the vehicle 100, and may include at least one type of acceleration, the change rate in the acceleration, the number of engine revolutions per minute, and the engine torque of the vehicle 100 as described above.

However, the drive ability factor is not limited to the above described types and may be variously implemented as long as it can exert an influence on the drive ability according to the speed change of the vehicle 100.

The correlation information 500 between the emotion state information 400 and the drive ability factor includes information indicating a drive ability factor corresponding to the type of the emotion state information 400 and information indicating the degree of increase/decrease of the setting value according to the type of the drive ability factor.

The vehicle 100 according to the exemplary embodiment may determine at least one drive ability factor corresponding to the type of the emotion state information 400 (950).

In detail, the control unit 120 may determine at least one drive ability factor corresponding to the type of the emotion state information on the basis of the correlation information 500 between the emotion state information 400 and the drive ability factor.

The vehicle 100 according to the exemplary embodiment may update the setting value of the determined drive ability factor according to the degree of increase/decrease corresponding thereto (960).

In detail, the control unit 120 may update the setting value of the drive ability factor determined according to the type of the emotion state information 400, according to the degree of increase/decrease corresponding thereto.

For example, the control unit 120, in a response to determining that the degree of positive to the speed responsiveness is determined to be equal to or less than a predetermined threshold value, may determine the change rate in the acceleration or the number of engine revolutions per minute as at least one drive ability factor corresponding to the degree of positive to the speed responsiveness, and perform the updating such that the change rate in the acceleration is increased according to the degree of increase/decrease corresponding thereto or the number of engine revolutions per minute is increased according to the degree of increase/decrease corresponding thereto.

Furthermore, the control unit 120, in a response to determining that the degree of positive to the speed acceleration capability is determined to be equal to or less than a predetermined threshold value, may determine the change rate in the acceleration or the engine torque as at least one drive ability factor corresponding to the degree of positive to the speed acceleration capability, and perform the updating such that the change rate in the acceleration is increased according to the degree of increase/decrease corresponding thereto or the engine torque is increased according to the degree of increase/decrease corresponding thereto.

Furthermore, the control unit 120, in a response to determining that the degree of positive to the speed linearity is equal to or less than the predetermined threshold value or the degree of negative to the speed change is equal to or greater than the predetermined threshold value, may determine the acceleration or the number of engine revolutions per minute as at least one drive ability factor corresponding to thereto, and perform the updating such that the acceleration is decreased according to the degree of increase/decrease corresponding thereto or the number of engine revolutions per minute is decreased according to the degree of increase/decrease corresponding thereto.

Figure 10:
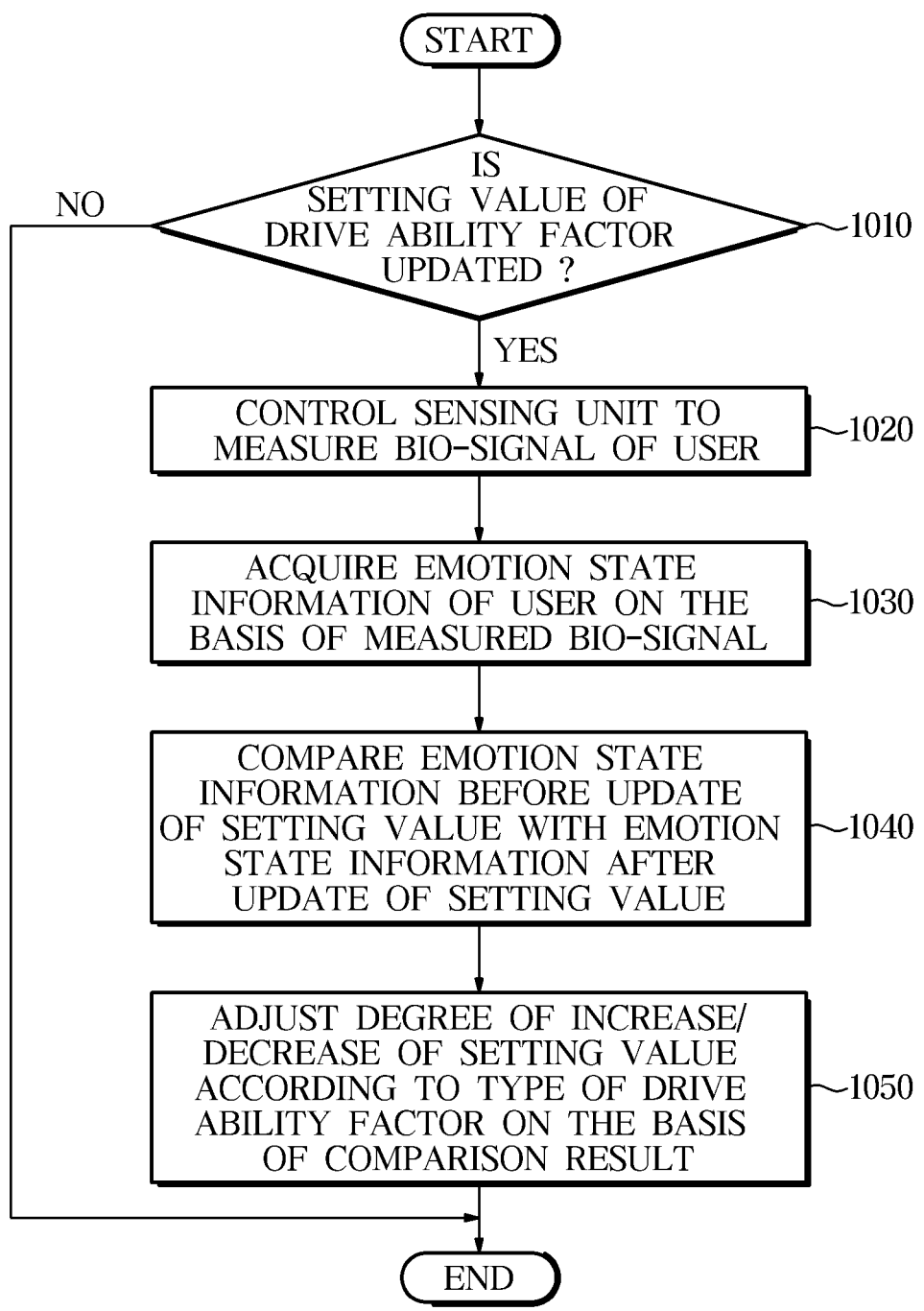
FIG. 10 is a flowchart of a method of controlling a vehicle, which shows adjusting the degree of increase/decrease of a setting value according to the type of a drive ability factor.

FIG. 10 is a flowchart of a method of controlling the vehicle 100, which shows adjusting the degree of increase/decrease of the setting value according to the type of a drive ability factor.

Referring to FIG. 10, when the setting value of the drive ability factor is updated (YES in operation 1010), the vehicle 100 according to the exemplary embodiment may control the sensing unit 110 to measure the bio-signal of the user (1020).

In detail, the control unit 120 may control the sensing unit 110 to measure the bio-signal of the user when the setting value of the drive ability factor is updated. Accordingly, the sensing unit 110 may measure the bio-signal of the user after the setting value of the drive ability factor is updated.

The vehicle 100 according to the exemplary embodiment may acquire the emotion state information 400 of the user on the basis of the measured bio-signal (1030).

In detail, the control unit 120 may acquire the emotion state information 400 of the user on the basis of the bio-signal of the user measured after the setting value of the drive ability factor is updated.

The vehicle 100 according to the exemplary embodiment may compare the emotion state information 400 before the updating of the setting value update with the emotion state information 400 after the updating of the setting value (1040).

In detail, the control unit 120 may compare the emotion state information 400 acquired after the setting value of the drive ability factor is updated with the emotion state information 400 acquired before the setting value of the drive ability factor is updated.

The vehicle 100 according to the exemplary embodiment may adjust the degree of increase/decrease of the setting value according to the type of drive ability factor on the basis of the comparison result (1050).

In detail, the control unit 120 may adjust the degree of increase/decrease of the setting value according to the type of the drive ability factor on the basis of the comparison result.

For example, the control unit 120, when the degree of positive of the emotion state information 400 acquired after the setting value of the drive ability factor is updated has a quantitative value higher than that acquired before the setting value of the drive ability factor is updated, or when the degree of negative of the emotion state information 400 acquired after the setting value of the drive ability factor is updated has a quantitative value lower than that acquired before the setting value of the drive ability factor is updated, may adjust the degree of increase/decrease corresponding to each type of the drive ability factor such that the absolute value of the degree of increase/decrease is reduced.

That is, when the degree of positive of the emotion state information 400 is increased or the degree of negative of the emotion state information 400 of the user is decreased, the vehicle 100 may allow the setting value of the drive ability factor to be not changed in a great range by reducing the absolute value of the degree of increase/decrease. Accordingly, the user is prevented from having a stress due to a change of the setting value of the drive ability in a great range, while maintaining the situation in which the degree of positive of the emotion state information 400 is increased or the degree of negative of the emotion state information 400 is decreased.

Furthermore, the control unit 120, when the degree of positive of the emotion state information 400 acquired after the setting value of the drive ability factor is updated has a quantitative value lower than that acquired before the setting value of the drive ability factor is updated, or when the degree of negative of the emotion state information 400 acquired after the setting value of the drive ability factor is updated has a quantitative value higher than that acquired before the setting value of the drive ability factor is updated, may adjust the degree of increase/decrease corresponding to each type of the drive ability factor such that the absolute value of the degree of increase/decrease is increased.

That is, when the degree of positive of the emotion state information 400 is decreased or the degree of negative of the emotion state information 400 of the user is increased, the vehicle 100 may allow the setting value of the drive ability factor to be changed in a greater range by increasing the absolute value of the degree of increase/decrease such that the degree of positive of the emotion state information 400 of the user is increased or the degree of negative of the emotion state information 400 of the user is decreased. Accordingly, the user may be satisfied from a change of the setting value of the drive ability in a greater range, while allowing the degree of positive of the emotion state information 400 to be increased or the degree of negative of the emotion state information 400 to be decreased.

Accordingly, the control unit 120 may adjust the degree of increase/decrease of the setting value according to the type of the drive ability factor by comparing the emotion state information 400 acquired after the setting value of the drive ability factor is updated with the emotion state information 400 acquired before the setting value of the drive ability factor is updated.

That is, the control unit 120 may update the correlation information 500 between the emotion state information 400 and the drive ability factor by adjusting the degree of increase/decrease of the setting value according to the type of the drive ability factor. Correlation information 800 updated as such may include information related to the adjusted degree of increase/decrease of the setting value according to the type of the drive ability factor, and may be stored in the storage unit 150 according to the control of the control unit 120.

Meanwhile, the disclosed exemplary embodiments may be embodied in a form of a recording medium storing instructions executable by a computer. The instructions may be stored in a form of program code and, when executed by a processor, may generate a program module to perform the operations of the disclosed exemplary embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and the method of controlling the same can determine the emotion state of the user and adjust the speed change of the vehicle on the basis of the determined emotion state, and thus providing drive ability satisfactory to the user.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   an acceleration sensor;
   a bio-signal sensor;
   a memory configured to store first correlation information indicating a relationship between bio-signals of a user and predetermined emotion factors, second correlation information indicating a relationship between the predetermined emotion factors and predetermined emotion state information, and third correlation information indicating a relationship between at least one drive ability factor related to a speed change and the predetermined emotion state information,
   wherein the at least one drive ability factor includes at least one of acceleration, a change rate in the acceleration, a number of engine revolutions per minute, and an engine torque of the vehicle, and
   wherein the third correlation information includes an increase or decrease degree of a setting value of each of the at least one drive ability factor; and
   a controller configured to
   measure an acceleration of the vehicle through the acceleration sensor,
   identify a first emotion state information of the user from among the predetermined emotion state information, based on a bio-signal measured through the bio-signal sensor, the first correlation information and the second correlation information, when the measured acceleration is determined to be greater than or equal to a predetermined threshold acceleration, and
   control a speed of the vehicle by updating a first setting value of a first drive ability factor, which corresponds to the first emotion state information, among the at least one drive ability factor based on the third correlation information and the first emotion state information,
   wherein the predetermined emotion state information includes at least one type of a degree of positive to a speed responsiveness of the vehicle, a degree of positive to a speed linearity of the vehicle, and a degree of positive to a speed acceleration capability of the vehicle and a degree of negative to the speed change of the vehicle.

2. The vehicle of claim 1, wherein the controller is configured to update the first setting value of the first drive ability factor such that the degree of positive to the emotion state information is increased or the degree of negative to the emotion state information is decreased.

3. The vehicle of claim 1, wherein the controller, when the degree of positive to the speed responsiveness is determined to be equal to or less than a predetermined threshold value, is configured to determine the change rate in the acceleration or the number of engine revolutions per minute as the at least one drive ability factor corresponding to the degree of positive to the speed responsiveness, and to perform the updating such that the change rate of acceleration is increased according to a degree of increase or decrease corresponding thereto or the number of engine revolutions per minute is increased or decreased according to a degree of increase or decrease corresponding thereto.

4. The vehicle of claim 1, wherein the controller, when the degree of positive to the speed acceleration capability is determined to be equal to or less than a predetermined threshold value, is configured to determine the change rate in the acceleration or the engine torque as the at least one drive ability factor corresponding to the degree of positive to the speed acceleration capability, and to perform the updating such that the change rate in the acceleration is increased according to a degree degree of increase or decrease corresponding thereto or the engine torque is increased or decreased according to a degree of increase or decrease corresponding thereto.

5. The vehicle of claim 1, wherein the controller, when the degree of positive to the speed linearity is determined to be equal to or less than a predetermined threshold value or the degree of negative to the speed change is determined to be higher than or equal to a predetermined threshold value, is configured to determine the acceleration or the number of engine revolutions per minute as the at least one drive ability factor corresponding thereto, and to perform the updating such that the acceleration is decreased according to a degree of increase or decrease corresponding thereto or the number of engine revolutions per minute is decreased according to a degree of increase or decrease corresponding thereto.

6. The vehicle of claim 1, wherein the controller, when the first setting value of the first drive ability factor is updated, is configured to control the bio-signal sensor to measure an additional bio-signal of the user, to identify a second emotion state information of the user from among the predetermined emotion state, based on the additional bio-signal and to adjust a degree of increase or decrease of the first setting value by comparing the second emotion state information with the first emotion state information.

7. A method of controlling a vehicle, the method comprising:
storing first correlation information indicating a relationship between bio-signals of a user and predetermined emotion factors, second correlation information indicating a relationship between the predetermined emotion factors and predetermined emotion state information, and third correlation information indicating a relationship between at least one drive ability factor related to a speed change and the predetermined emotion state information,
wherein the at least one drive ability factor includes at least one of acceleration, a change rate in the acceleration, a number of engine revolutions per minute, and an engine torque of the vehicle, and
wherein the third correlation information includes an increase or decrease degree of a setting value of each of the at least one drive ability factor,
measuring an acceleration of the vehicle;
identifying, by a controller, a first emotion state information of the user from among the predetermined emotion state information, based on a measured bio-signal, the first correlation information and the second correlation information, when the measured acceleration is determined to be greater than or equal to a predetermined threshold acceleration; and
controlling a speed of the vehicle by updating a first setting value of a first drive ability factor, which corresponds to the first emotion state information, among the at least one drive ability factor based on the third correlation information and the first emotion state information,
wherein the predetermined emotion state information includes at least one type of a degree of positive to a speed responsiveness of the vehicle, a degree of positive to a speed linearity of the vehicle, and a degree of positive to a speed acceleration capability of the vehicle and a degree of negative to the speed change of the vehicle.

8. The method of claim 7, wherein the updating of the first setting value of the first drive ability factor includes performing updating such that the degree of positive to the emotion state information is increased or the degree of negative to the emotion state information is decreased.

9. The method of claim 7, wherein the updating of the first drive ability factor includes:
when the degree of positive to the speed responsiveness is determined to be equal to or less than a predetermined threshold value, determining the change rate in the acceleration or the number of engine revolutions per minute as the at least one drive ability factor corresponding to the degree of positive to the speed responsiveness; and
performing updating such that the change rate of acceleration is increased according to a degree of increase or decrease corresponding thereto or the number of engine revolutions per minute is increased or decreased according to a degree of increase or decrease corresponding thereto.

10. The method of claim 7, wherein the updating of the drive ability factor includes:
when the degree of positive to the speed acceleration capability is determined to be equal to or less than a predetermined threshold value, determining the change rate in the acceleration or the engine torque as the at least one drive ability factor corresponding to the degree of positive to the speed acceleration capability; and
performing updating such that the change rate in the acceleration is increased according to a degree of increase or decrease corresponding thereto or the engine torque is increased or decreased according to a degree of increase or decrease corresponding thereto.

11. The method of claim 7, wherein the updating of the drive ability factor includes:
when the degree of positive to the speed linearity is determined to be equal to or less than a predetermined threshold value or the degree of negative to the speed change is determined to be higher than or equal to a predetermined threshold value, determining the acceleration or the number of engine revolutions per minute as the at least one drive ability factor corresponding thereto; and
performing updating such that the acceleration is decreased according to a degree of increase or decrease corresponding thereto or the number of engine revolutions per minute is decreased according to a degree of increase or decrease corresponding thereto.

12. The method of claim 7, further including:
measuring an additional bio-signal of the user when the first setting value of the first drive ability factor is updated;
identifying a second emotion state information of the user from among the predetermined emotion state, based on the additional bio-signal; and
adjusting a degree of increase or decrease of the first setting value by comparing the second emotion state information with the first emotion state information.

* * * * *